United States Patent [19]

Gianella et al.

[11] Patent Number: 4,730,499
[45] Date of Patent: Mar. 15, 1988

[54] MEASUREMENT OF FLOW RATE OF POWDER FROM A HOPPER

[75] Inventors: Edward P. Gianella, Teaneck; Bernard R. Katz, Rockaway, both of N.J.; Stephen A. Bauman, Flushing, N.Y.

[73] Assignee: The Perkin-Elmer Corporation, Norwalk, Conn.

[21] Appl. No.: 927,012

[22] Filed: Nov. 4, 1986

[51] Int. Cl.⁴ .................... G01F 1/00; G01G 11/06
[52] U.S. Cl. ..................................... 73/861; 177/185
[58] Field of Search .................. 73/861, 223, 296; 177/185; 222/55

[56] References Cited

U.S. PATENT DOCUMENTS

| | | | |
|---|---|---|---|
| 3,855,458 | 12/1974 | Motter et al. | 222/55 |
| 4,051,431 | 9/1977 | Wurster | 73/861 X |
| 4,277,022 | 7/1981 | Holdsworth . | |
| 4,320,855 | 3/1982 | Ricciardi et al. | 177/185 X |
| 4,561,808 | 12/1985 | Spaulding et al. . | |

FOREIGN PATENT DOCUMENTS 2946569 11/1979 Fed. Rep. of Germany .

Primary Examiner—Herbert Goldstein
Attorney, Agent, or Firm—H. S. Ingham; F. L. Masselle; E. T. Grimes

[57] ABSTRACT

In a system and a method for measuring the rate at which powdered material flows from a container wherein a first analog signal representing the weight of the container is produced, the analog signal is differentiated to obtain a second signal corresponding to the flow rate and the second signal is passed through an adaptive filter. The adaptive filter includes a first low pass filter having a first time constant for producing a third signal and a second low-pass filter to produce a fourth signal. The time constant of the second filter is varied between a minimum equal to the time constant of the first filter and a maximum equal to a preselected multiple of the time constant of the first filter by comparing the absolute value of the difference between the third and fourth signals to a preselected deadband and effecting the maximum time constant when the absolute value of the difference is less than the deadband and the minimum time constant when the absolute value of the difference is greater than the deadband. A combination signal is provided from the fourth signal during the time when the absolute value of the difference is less than the deadband and the third signal during the time when the absolute value of the difference is greater than the deadband. The combination signal is scaled to indicate the powdered material flow rate.

21 Claims, 7 Drawing Figures

MEASUREMENT OF FLOW RATE OF POWDER FROM A HOPPER

The present invention relates to a system and method for measuring the rate at which powdered material flows from a hopper.

BACKGROUND OF THE INVENTION

U.S. Pat. No. 4,561,808 discloses a powder feeding system for a thermal spray gun which provides uniform control of powder feed rate. While this device controls the rate of feed through the feed tube, it is also desirable to measure the feed rate from the hopper itself to give an instantaneous indication of either too high or too low a feed rate which would materially affect the quality of a coating when the hopper is used to supply thermal spraying material.

Specifically, in coating processes, powdered materials are fed into a heat source. The rate at which the powders are fed is a critical process parameter. Prior to the present invention, there was no suitable means for determining powder flow rate while a part was being sprayed. Other commercially available devices were either too slow to respond or could not be calibrated in engineering units for all materials and were too costly.

The commercially available devices use weight loss over a fixed time period to produce a measurement of the flow rate of material from a hopper. This however results in jitter in the display of feed rate due to noisy amplifiers and inadequate filtering when the selected time period is too short, or too slow a response to transients when longer time intervals are selected.

The main object of the present invention is to provide a fast response to transients in the feed rate of powdered material from a hopper or other container and to eliminate the disadvantages of prior art techniques.

These and other objects and advantages of the present invention are achieved in accordance with the present invention by the use of adaptive filtering techniques whereby jitter in the output at short time intervals is eliminated through the use of an extremely low noise amplifier stage and a multipole low pass filter.

SUMMARY OF THE INVENTION

In accordance with the present invention a system for measuring the rate at which powdered material flows from a container comprises means for providing a first analog signal representing the weight of a container from which powdered material flows, means for differentiating the analog signal to obtain a second analog signal corresponding to the flow rate, and adaptive filtering means for the second signal which includes a first low pass filter having a first time constant and receptive of the second signal for producing a third signal, and further includes a second low pass filter means in series with the first filter to produce a fourth signal. The second filter has a variable time constant and is responsive to a control signal for varying the time constant between a minimum which is equal to the time constant of the first filter and a maximum which is a preselected multiple of the time constant of the first filter.

The adaptive filtering means also includes means receptive of the third and fourth signals from the two filters for producing the control signal. The receptive means comprises comparator means for comparing the absolute value of the difference between the voltage amplitudes of the third and fourth signals to a preselected deadband voltage, and means for varying the control signal to effect the maximum time constant in the second filter when the absolute value of the difference is less than the deadband and to effect a minimum time constant when the absolute value of the difference is greater than the deadband.

The means for producing the control signal preferably comprises deadband selecting means receptive of the third signal for producing one of a preselected group of deadband reference signals, preferably three signals, one of which is selected in dependence on the amplitude of the output of the first filter. The comparator means for comparing, compares the selected deadband reference signal to the absolute value of the difference between the third and fourth signals and produces an output control signal corresponding to the comparison.

In a preferred embodiment, the output signal of the comparator means is used for varying the control signal by means of a pulse width modulating means which is receptive of the output signal of the comparator and applying it to a sawtooth waveform for producing a narrow pulse width when the output of the comparator means corresponds to the absolute value of the difference being less than the deadband reference signal, and a wide pulse width when the output of the comparator means corresponds to the absolute value of the difference being greater than the deadband reference signal. Lag means are included in the comparator means to effect a finite time period of transition between the narrow and wide pulse widths, and thereby between the maximum and minimum time constant positions of the second filter.

The output of the second filter may be scaled directly for display of powder feed rate. However, the adaptive filter preferably includes means for producing a combination signal comprising the fourth signal during the time when the absolute value of the difference is less than the deadband and the third signal during the time when the absolute value of the difference is greater than the deadband. The combination signal is then scaled to indicate the powdered material flow rate which can be displayed on a digital voltmeter meter or the like.

The present invention also includes a method for measuring the rate at which the powdered material flows from a container and comprises the steps of producing a first analog signal, preferably by means of a load cell, with the analog signal representing the weight of the container or hopper with the flowable material therein. The method also comprises differentiating the analog signal to obtain a second signal which corresponds to the flow rate and adaptively filtering the second signal by applying the second signal to a low pass filter having a first time constant for producing a third signal, applying the third signal to a second low pass filter to produce a fourth signal and varying the time constant of the second filter between a minimum equal to the time constant of the first filter and a maximum equal to a preselected multiple of the time constant of the first filter by comparing the absolute value of the difference between the third and fourth signals to a preselected deadband, and effecting the maximum time constant when the absolute value of the difference is less than the deadband and the minimum time constant when the absolute value of the difference is greater than the deadband.

These and other features of the present invention will become more apparent from the following detailed description of the invention taken with the drawings, wherein:

DETAILED DESCRIPTION OF THE INVENTION

Figure 1:
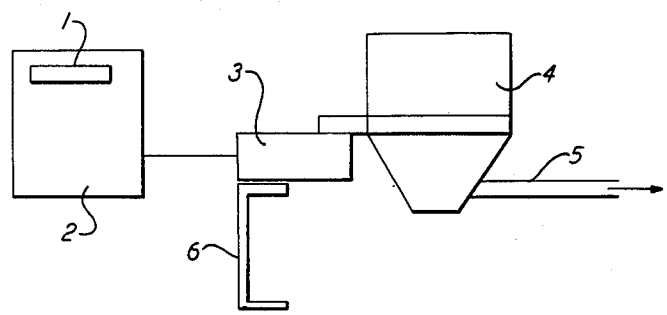
FIG. 1 shows an overall schematic of the mechanical aspect of the system according to the present invention.

Referring now to FIG. 1, the overall thermal spraying system shown schematically includes a hopper 4 filled with powdered material and suspended from a strain-gauge based force transducer 3 such as a conventional load cell. The load cell is rigidly attached to a bracket 6 and outputs a low level electrical signal on the order of 0 to 20 mv DC which is proportional to the weight of hopper 4. When a powder feeder control unit (not shown) is turned on, material flows from hopper 4 through a feed hose 5 and into the process heat source or other powder receptor. This causes the hopper weight and consequently the load cell output to decrease with time.

The signal from load cell 3 is routed to the system according to the present invention denoted by reference numeral 2 where the signal is conditioned to provide an output which is proportional to the rate of powder flow. This output is scaled in engineering units of feed rate and is displayed on a digital voltmeter display 1 as will be explained later.

Figure 2:
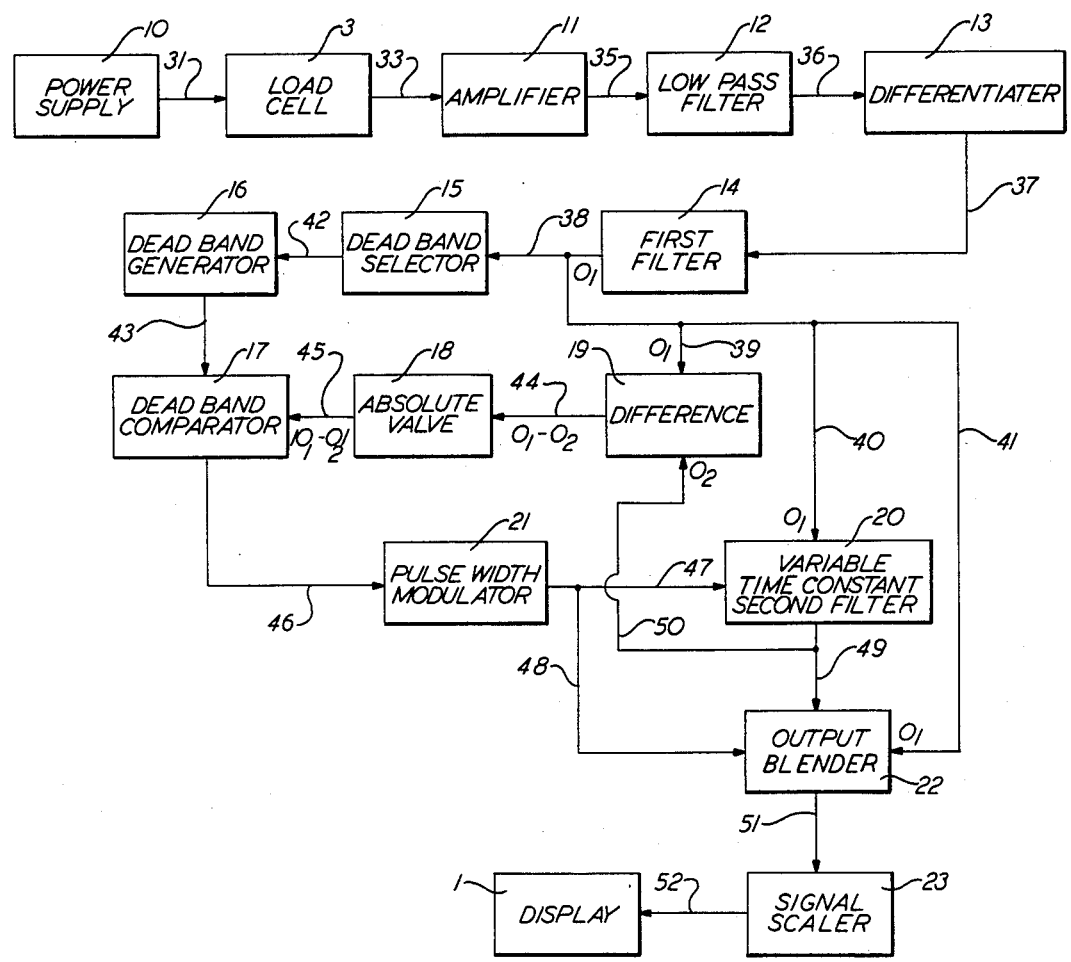
FIG. 2 is a block diagram showing functional details of the system of FIG. 1.

The signal conditioning in accordance with the present invention is generally accomplished by analog circuitry, an example of which is shown in FIG. 2 in the form of a block diagram of the system according to, and for carrying out the method of, the present invention.

A regulated power supply 10 is used to provide a strain gauge excitation voltage of, for example, 15 VDC to load cell 3 over line 32 in a conventional manner. An amplifier stage 11 is a conventional, ultralow-noise, temperature stable, operational amplifier and whose output at line 35 is connected to a standard multiple pole, low pass filter which is used in combination with amplifier 11 to amplify and filter the load cell output. This should yield an overall output sensitivity preferably at least 0.0035 of the full scale hopper weight, e.g., 0.0015%.

The time rate of change of the hopper weight is derived from the amplified and filtered weight signal on line 36 by a long time constant (preferably 1.5 sec) conventional differentiator 13 with a high frequency stop. The output at 37 of differentiator 13 is applied to two low pass filters 14 and 20 which are connected in series. Filter 14 is preferably a pair of cascaded conventional unity gain Sallen-Key filters, designed with appropriate resistors and capacitors for a selected time constant in the range of 0.1 to 10 seconds and preferably 3-4 seconds depending on the desired overall speed of response.

The second filter 20 is also of the Sallen-Key type and is described in detail hereinbelow. The time constant of the second filter 20 is variable, with its effective lower limit approximately equal to, or at least within a factor of 4 of, the time constant of the first filter 14, i.e. 3-4 seconds, and its upper limit set to a selected multiple (not necessarily an integer multiple) of the first filtered time constant which is required to achieve the desired degree of signal integration for flow rate display 1. Generally a maximum time constant between 10 seconds and two minutes, e.g. 60 seconds is desirable. The two filters 14, 20 in combination with circuit elements 15-19 and 21-22 constitute an adaptive filter whose purpose is to maximize signal integration when powder flow is steady and minimize response time during flow transients.

As shown in FIG. 2, the first filter has its output $0_1$ at line 38 which is connected to a deadband selector 15, to a difference circuit 19 via line 39, to a variable time constant second filter 20 via line 40 and to an output blender 22 via line 41. The output $0_2$ of second filter 20 is also sent, on line 49, to output blender 22, to be combined with $0_1$ as described hereinbelow. The output of deadband selector 15 is connected via line 42 to a deadband generator 16 which is in turn connected via line 43 to a deadband comparator 17. The other input of deadband comparator 17 is derived from a difference circuit 19 which receives, in addition to output $0_1$, the output $0_2$ from variable time constant filter 20 on line 50 so that the difference circuit 19 produces a signal at line 44 of $0_1 - 0_2$. This signal is then applied to an absolute value circuit 18 which produces at line 45 the absolute value signal $|0_1 - 0_2|$ and deadband comparator 17 compares the signals from the deadband generator 16 and the absolute value circuit 18 to produce an output signal on line 46 which is applied to a pulse width modulator 21 whose output at line 47 is a control signal fed to the control input of variable time constant second filter 20 and, via line 48, to the control input of output blender 22.

Figure 3:
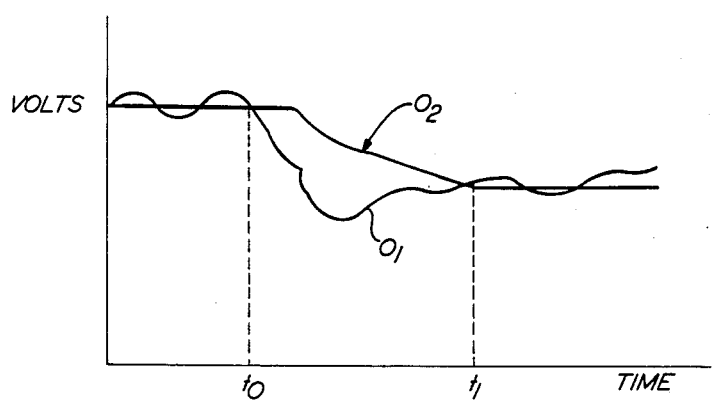
FIGS. 3-5 are graphs of the electrical signals generated in the block diagram of FIG. 2.
Figure 4:
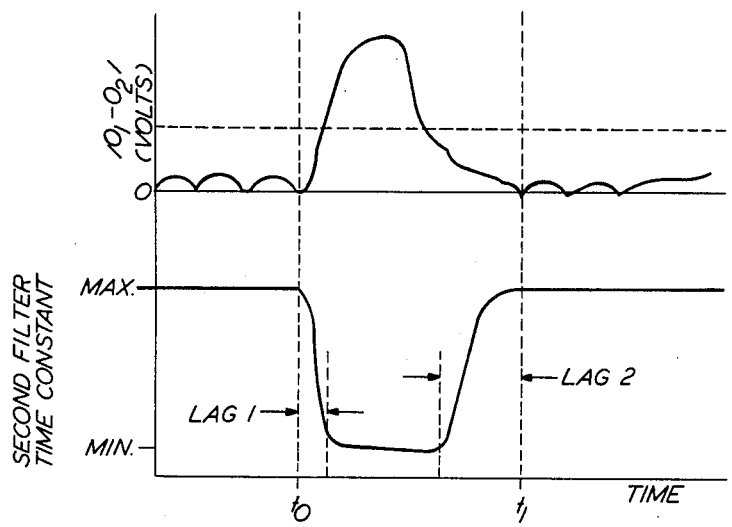
Figure 5:
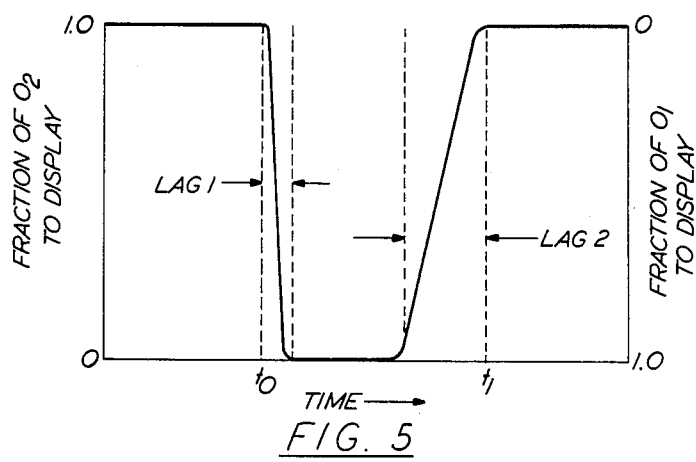

The function of the adaptive filter during a flow transient and the operation of individual elements of FIG. 2 will become clearer with reference to FIGS. 3-5.

In FIG. 3, the outputs $0_1$ and $0_2$ of the first and second filters 14 and 20 are shown. Prior to a time $t_0$ and after a time $t_1$ one can see that the outputs of the first and second filters are similar, correspond to times when the flow is relatively steady and, as can be seen from FIG. 4, the time constant of the second filter 20 is at its maximum.

At $t_0$, the flow begins to decrease and the first filter output begins falling rapidly. The output of the second filter stays high because its time constant is still at a maximum. The difference amplifier circuit 19 followed by the absolute value circuit 18 provide a signal $|0_1 - 0_2|$ shown in the upper portion of FIG. 4 which is the absolute value of the difference between the first and second filter outputs.

At the same time, deadband selector 15 has received the output $0^1$ of the first filter and has selected an appropriate deadband automatically by comparing the signal $0_1$ to preset voltages. Therefore, if a very high feed rate is being sensed, the deadband will be at a high value, whereas if a very low feed rate is being sensed, the deadband selector will select a lower deadband value. A middle range deadband is also provided for middle range flow rates.

The appropriate deadband is automatically selected by comparing $0_1$ to preset voltages which are proportioned to the feed rates and as the flow rates change, a transition from one deadband to the next is made. When the selected deadband is exceeded, as is shown by the horizontal dashed line in the upper part of FIG. 4, this is sensed by deadband comparator 17 and the output along line 46 is varied so that the pulse width modulator 21 starts applying pulses at its output which increase in pulse width from a minimum pulse width to a maximum pulse width.

These pulse width signals are applied to the control input of the variable time constant second filter 20, and the time constant of filter 20 then begins to decrease from its maximum value to its minimum value as is shown in the lower part of FIG. 4. Thus the second filter output begins to track towards the output of the first filter as can be seen in FIG. 3. At $t_1$, generally after the steady state flow is once again established, the absolute value of the difference between $0_1$ and $0_2$ will have dropped below the deadband level (FIG. 4) and the second filter time constant will increase back to its maximum value and the desired degrees of steady state signal integration will once again be achieved. The above description applies to a decreasing powder flow; a similar series of events will occur for an increasing flow.

To prevent problems with transients and filtering delays, a lag time effecting the change from maximum time constant to minimum time constant (lag 1) and from minimum time constant to maximum time constant (lag 2) is preferably set by two first order lag circuits which comprise a part of the deadband comparitor.

The time constant of the second filter 20 is varied by duty cycling its frequency determining resistors. Duty cycling is accomplished by using the pulse width modulated signal whose pulse width is proportional to the rising or falling DC output of the deadband comparator.

The output $0_2$ of the second filter 20 preferably is not sent immediately to signal scaler 23 because, due to filtering delays, output $0_2$ delays the first filter's output $0_1$ in time as indicated in FIG. 3. A faster response is provided by using the same pulse width modulated signal from pulse width modulator 21 on line 48 to blend the first and second filter outputs $0_1$ and $0_2$ in output blender 22. As shown in FIG. 5, prior to $t_0$ when powder flow is steady, the signal sent to the signal scaler 23 on line 51 is comprised entirely of the second filter output $0_2$. After $t_0$ when flow begins to decrease and $|0_1-0_2|$ exceeds the deadband, the fraction of $0_2$ sent to the display decreases while the fraction of $0_1$ increases. This continues during a time period lag 1 until the displayed feed rate is comprised entirely of the first filter output $0_1$. When steady state flow is again established, this process repeats itself in reverse during time period lag 2 until at time $t_1$ the displayed output consists entirely of the second filter output $0_2$.

Figure 6:
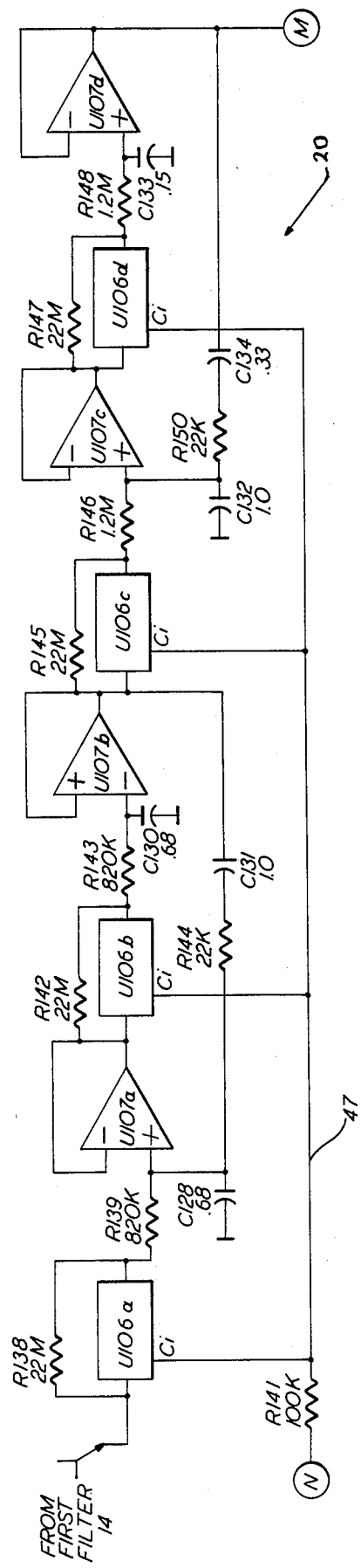
FIGS. 6 and 7 are circuit diagrams of certain elements of the block diagrams shown in FIG. 2.
Figure 7:
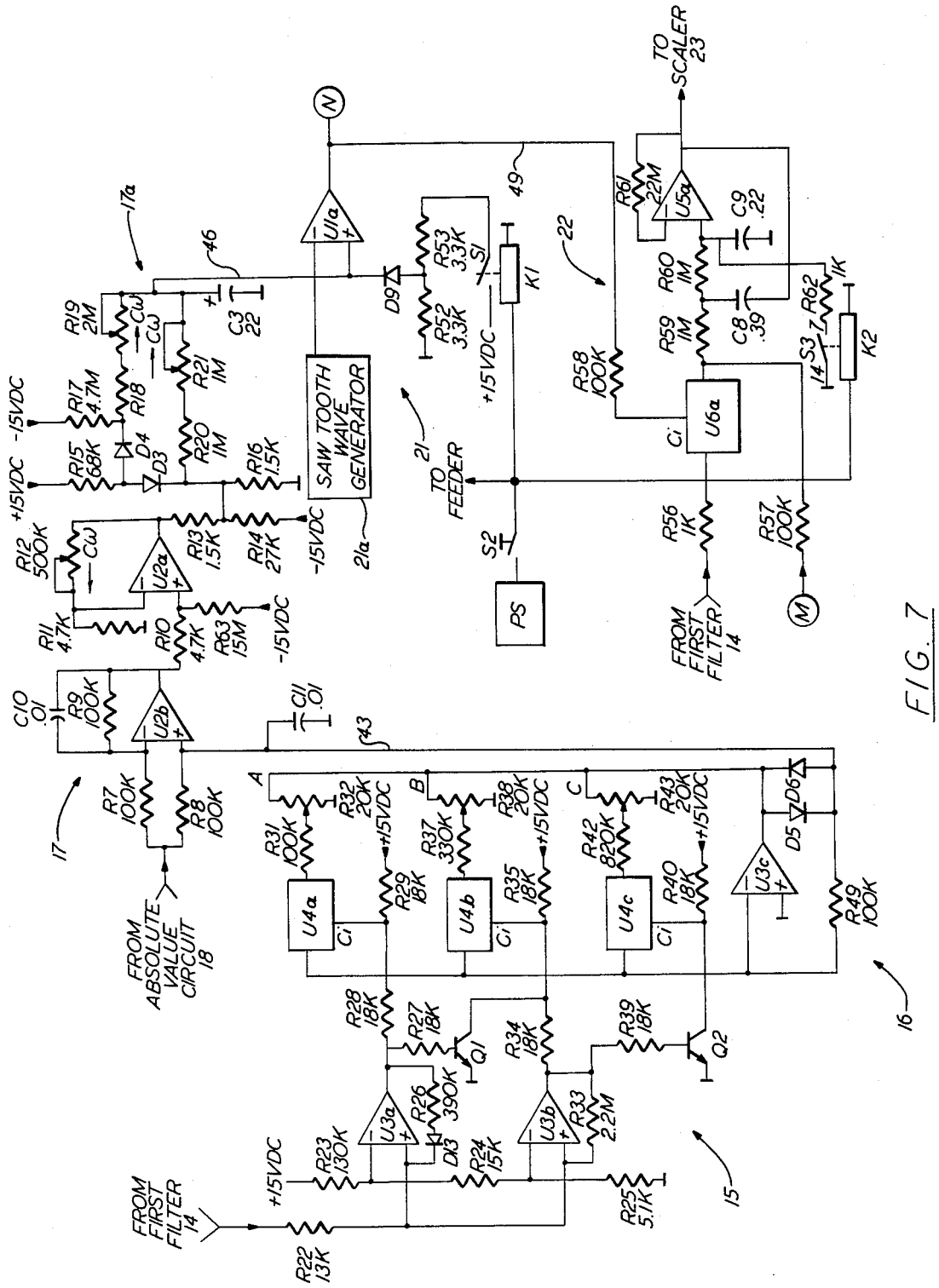

FIGS. 6 and 7 are diagrams of some of the specific circuitry shown in block diagram form shown in FIG. 2. FIG. 6 shows a circuit for the second filter 20. FIG. 7 illustrates difference circuit 19, absolute value circuit 18, dead band selector 15, dead band generator 16, dead band comparitor 17, pulse width modulator 21 and output blender 22. For clarity conventional circuitry such as power supply voltages and associated capacitors and the like associated with operational amplifiers are omitted; it will be appreciated that one skilled in the art will readily be able to include those elements.

General principals of Sallen-Key filters are given in such references as "Active-Filter Cookbook" by Don Lancaster (Howard W. Sams & Co., Inc., 1st. ed. 1975). A preferred embodiment for filter 20 is illustrated in FIG. 6. The second filter, a sixth order, low pass Sallen-Key filter with a voltage controlled cutoff frequency utilizes four ultra-low input bias current operational amplifiers U107a-d in series.. The preferred technique is to use four conventional bilateral analog switches U106-a-d to duty cycle frequency-determining resistors R138, R139, R142, R143, R145, R146, R147 and R148. The switches are driven by the output of pulse width modulator 21 via line 47.

The four Sallen-Key filters in circuit 20 are cascaded in pairs, each pair having a series resistance and capacitor feedback led from the output of the second operational amplifier to the positive input of the first operational amplifier; i.e., for the first stage from the U107b output through C131 and R144 to the U107a positive input, and similarly from U107d through C134, R150 to U107c. The remaining resistors R139, R143, R146, R148 and capacitors C128, C130, C132, C133 in curcuit 20 complete the frequency determining circuitry.

The pulse width modulator 21 shown in FIG. 7 includes a saw tooth generator 21a which may be of any conventional type which produces a sawtooth waveform at an amplitude of 5 VDC and a frequency substantially higher than the cutoff frequency of the second filter; e.g. at least 10 times and preferably 75 to 100 times higher, such as 30 Hz. The sawtooth waveform produced from this circuit is fed to one input of an operational amplifier U1a whose other input is the output of deadband comparator 17 as will be explained hereinafter. By comparing the output of the deadband comparator 17 to the sawtooth generator 21a, a variable pulse width output signal will be obtained which is applied via line 47 to the variable time constant second filter 20 as shown in FIG. 2.

The pulse width modulator signal on line 47 from the output of circuit 21 is fed via connection N to the control input of the four analog switches U106 of circuit 20 (FIG. 6). (Control inputs to analog switches are designated "ci" in FIGS. 6 and 7.) Each switch has disposed in parallel therewith a 22 megohm time-constant resistors R138, R142, R145, R147 so that, when the switch is closed by a pulse, this resistor is short circuited (bypassed) and, when the switch is open, the resistor is in series with the remaining RC time constant resistors and capacitors R139, R143, R144, R146, R148, R150 and capacitors C128, C130, C131, C132, C133, C134.

Thus, as was explained heretofore, by duty cycling filter 20 with a pulse width modulated signal, the effective time constant of the filter will be established in dependence upon the duty cycle time during each cycle of the modulated sawtooth signal that the switches are closed and open and therefore the 22 megohm resistors are out of the circuit to produce the minimum time constant of, e.g., 3-4 seconds or are in the circuit to produce the maximum time constant of, e.g., 60 seconds.

The difference circuit 19 (FIG. 2) is formed conventionally with a general purpose operational amplifier in a unity gain configuration. The absolute value circuit 18, connected to the output $0_1-0_2$ of difference circuit 19, is also a conventional inverting operational amplifier type circuit with unity gain and feeds its signal $|0_1-0_2|$ as a negative voltage via line 43 to deadband comparator 17 which processes $|0_1-0_2|$ as well as sends $|0_1-0_2|$ on line 43 to deadband generator 16 as described hereinbelow.

The deadband selector 15 and generator circuits 16 are shown in more detail in FIG. 7. Deadband selector 15 has as its input the output of first filter 14 via line 38, which output is placed into two comparator circuits comprising two operational amplifiers U3a, U3b with resistors R26, R33 and diode D13. At the other inputs of each of the amplifiers are two reference voltages obtained by a voltage divider comprising resistors R23, R24, R25 so that the input signal $0_1$ is compared to the two reference voltages.

The two comparator circuits, in conjunction with two switching transistors Q1, Q2 activate one of three analog switches U4a, U4b, U4c. The corresponding deadband value is thereby chosen by the signal from $0_1$ turning on one of the analog switches which puts the appropriate feedback network A, B or C on line 43 into deadband generator circuit 16.

Circuit 16 has at its input at R49 $|0_1-0_2|$ (via line 43) which is always a negative signal. Amplifier U3c in combination with R49 and the selected feedback loop A, B or C is configured as an inverting amplifier so that its output is always positive. The gain of amplifier U3c and consequently the deadband value is set by the selected feed back loop A,B or C. Hence U3c amplifies $|0_1-0_2|$ by an amount dependent on the selected deadband value so that, when $|O_1-O_2|$ reaches the deadband value, the output of U3c will forward bias the diode D5 to a voltage sufficient for the diode to conduct and supply current back to circuit 17 through line 43 to the non-inverting input of U2b.

The deadband generator therefore has the effect of placing a limit on the non-inverting input of U2b in circuit 17 at the selected deadband value through line 43 so that, as $|0_1-0_2|$ exceeds the deadband, output from circuit 16 causes the inputs of U2b to become unbalanced, causing its output to become non-zero.

When $|0_1-0_2|$ is less than the selected deadband value, the inverting and non-inverting inputs of U2b will remain equal, having as a common input $|0_1-0_2|$ through resistors R7 and R8. Consequently, the output of U2b will be zero when $|0_1-0_2|$ is less than the selected deadband and non-zero when $|0_1-0_2|$ exceeds the deadband.

Deadband ranges are chosen corresponding to a powder feed rate range of, for example, 0 to 5, 5 to 20, or 20 to 100 pounds per hour. Thus a corresponding deadband value and, therefore, response sensitivity of, for example, 0.3, 0.75 and 1.5 pounds per hour is to be automatically selected depending upon the amplitude of output $0_1$ of the first filter 14. Other values for R23-R25 may be chosen for other feed rate ranges, and other values for R31, R37 and R42 may be selected for other deadband values and sensitivities.

The signal, if any, from U2b is processed by the operational amplifier U2a, resistors R10-R21 and a 22 microfarad capacitor C3 and diodes D3, D4 to obtain the output voltage signal for feeding into the pulse width modulator 21. The next amplifier U2a with resistors R10-R12 is configured as a non-inverting amplifier with a gain of approximately 100 so that, even for small input signals from U2b, its output will saturate positive when the selected deadband value is exceeded.

Continuing into lag circuit 17a, a high positive output from amplifier U2a biases the resistor network R13-R21 and causes the output voltage on C3 to charge through resistors R15, R18 and R19 and diode D4 from zero to approximately 7 VDC over a lag 1 time period (FIGS. 4 and 5) of preferably about 15 l seconds. Similarly when $|0_1-0_2|$ is less than the selected deadband value, the output of U2a is zero and C3 will discharge through resistors R21, R20, R16, and R13 over a lag 2 time period of preferably 30 seconds. Resistor 14 is in the circuit to force the junction of R13, R16, R20 and D3 to ground or below if the input offset voltage of U2a is positive. This assures that C22 discharges fully so that the pulse width goes to zero.

The voltage imposed on C3 sets the control voltage on line 46 to amplifier U1a of pulse width modulator 21. The voltage from curcuit 17 thus modulates the sawtooth wave in operational amplifier U1a providing the pulsed control signal output on line 49 and, through connector N, to analog switches U106 in the second filter circuit 20 (FIG. 6), with effects as described hereinabove. A high voltage from circuit 17 corresponds to wide pulse width and a resulting short time constant for the second filter 20, and a low voltage corresponds to narrow pulse width and a resulting long time constant. The phrases "wide pulse width" and "narrow pulse width" as used herein and in the claims refer to the respective pulse widths necessary to duty cycle analog switches U106 (FIG. 6) for the required minimum or maximum time constant.

The outputs of the two filters 14 and 20 are then fed to the output blending circuit 22 having an analog switch U6a which is duty cycled by the output of pulse width modulator 21 by feeding its control signal on line 49 to the control input of analog switch U6a. Thus analog switch U6a selectively passes signal $0_1$ from filter 14 to combine with and override signal $0_2$ which is received from filter 20 via connection M. The analog switch is followed by a low pass unity gain Sallen-Key filter including operational amplifier U5a, resistors R59-R61 and capacitors C8, C9 which smooth the blended output. The output is thereafter processed by scaling circuit 23 (FIG. 2) which consists of a standard voltage divider configuration. As previously indicated, the scaler output is then presented to display 1 (FIGS. 1 and 2) for display of powder feed rate.

It is desirable to start the system with the short time constant so as to quickly display an initial powder flow rate. Switch S1 (FIG. 7) is normally closed during idle of the circuits, without powder feeding, providing a voltage through resistor R53 and diode D9 to U1a to set a high pulse width output. When the powder feeding is started by closing switch $S_2$, power from a power supply PS for the feeder is simultaneously fed to solenoid K1 that opens S1, transferring the source of input to U1a over to circuit 17.

Similarly, on shutdown a rapid ramp-down of the display is desired at shutoff of powder feed. This is conveniently done with switch S3 which is held open during operation and closes when power is removed from solenoid K2, directing the signal from analog switch U6a to ground through resistor R62.

It will be appreciated that the instant specification and claims are set forth by way of illustration and not limitation, and that various modifications and changes may be made without departing from the spirit and scope of the present invention.

What is claimed is:

1. A system for measuring the rate at which powdered material flows from a container, comprising:
    means for producing a first analog signal representing the weight of a container from which powdered material is flowable;
    means for differentiating the first analog signal to obtain a second signal corresponding to the flow rate;

adaptive filtering means for the second signal including:

a. a first low pass filter means having a first time constant and being receptive of the second signal for producing a third signal;

b. second low-pass filter means having a variable time constant ranging from a minimum value approximately within a factor of 4 of the time constant of the first filter to a maximum value equal to a preselected multiple of the time constant of the first filter and being responsive to a control signal for varying the time constant between the minimum value and the maximum value and wherein the second filter means is receptive of the third signal for producing a fourth signal; and c. means receptive of the third and fourth signals for producing the control signal, comprising comparator means for comparing the absolute value of the difference between the third and fourth signals to a preselected deadband and means for varying the control signal such as to effect the maximum time constant in the second filter means when the absolute value of the difference is less than the deadband and to effect the minimum time constant when the absolute value of the difference is greater than the deadband; and means receptive of the fourth signal for scaling same to indicate the powdered material flow rate.

2. A system for measuring the rate at which powdered material flows from a container, comprising:

means for producing a first analog signal representing the weight of a container from which powdered material is flowable;

means for differentiating the first analog signal to obtain a second signal corresponding to the flow rate;

adaptive filtering means for the second signal including:

a. a first low pass filter means having a first time constant and being receptive of the second signal for producing a third signal;

b. second low-pass filter means having a variable time constant ranging from a minimum value approximately within a factor of 4 of the time constant of the first filter to a maximum value equal to a preselected multiple of the time constant of the first filter and being responsive to a control signal for varying the time constant between the minimum value and the maximum value and wherein the second filter means is receptive of the third signal for producing a fourth signal; and c. means receptive of the third and fourth signals for producing a control signal, comprising comparator means for comparing the absolute value of the difference between the third and fourth signals to a preselected deadband and means for varying the control signal such as to effect the maximum time constant in the second filter means when the absolute value of the difference is less than the deadband and to effect the minimum time constant when the absolute value of the difference is greater than the deadband; and d. combination signal means receptive of the third and fourth signals and responsive to the control signal for producing a combination signal comprising the fourth signal during the time when the absolute value of the difference is less than the deadband and the third signal during the time when the absolute value of the difference is greater than the deadband; and means receptive of the combination signal for scaling same to indicate the powdered material flow rate.

3. The system according to claim 2 further comprising diode means for establishing the preselected deadband reference signal, the diode means being responsive to the absolute value such that when the absolute value exceeds the deadband reference signal the diode means effects a current signal to the comparator means.

4. The system according to claim 1 or 2, wherein the means for producing the control signal further comprises deadband selecting means receptive of the third signal for producing one of a preselected group of deadband reference signals in dependence on the amplitude of the third signal and wherein the comparator means compares the one deadband reference signal to the absolute value of the difference between the third and fourth signals and produces an output corresponding to the comparison.

5. The system according to claim 4 wherein the deadband selecting means comprises a plurality of comparator circuits each having a corresponding reference voltage and at least one corresponding means for switching, each comparator circuit being adapted to compare the third signal with the corresponding reference voltage to selectively produce a comparator signal, the corresponding switching means including a corresponding deadband reference circuit for generating the selected deadband reference signal, the switching means being responsive to the comparator signal to select the corresponding deadband reference circuit in response to the comparator signal.

6. The system according to claim 5 further comprising diode means for establishing the preselected deadband reference signal, the diode means being responsive to the absolute value such that when the absolute value exceeds the deadband reference signal the diode means effects a current signal to the comparator means, the diode means comprising a diode having a preselected conducting voltage characteristic, a negative terminal lead to the comparator means, and a positive terminal, the diode means further comprising a voltage gain amplifier, wherein each deadback reference circuit comprises a feedback resistance selectively configured with the voltage gain amplifier to selectively determine the gain of the voltage gain amplifier upon the response of the corresponding switching means to the comparator signal, the voltage gain amplifier having as input the absolute value, and an output connected to the positive terminal, such that the selected deadband reference circuit and the diode means cooperate to establish the deadband reference signal.

7. The system according to claim 6 wherein the comparator means comprises an input resistor and a comparator amplifier having an inverting input and non-inverting input with the input resistor connected therebetween, the inverting and non-inverting inputs being receptive of the absolute value, and one of the inverting and non-inverting inputs being receptive of the current signal, such as to cooperatively effect an output of the comparator amplifier.

8. The system according to claim 7 wherein the comparator further comprises lag means for effecting a preselected first transition period between a first time period when the combination signal comprises the fourth signal and a second time period when the combination signal comprises the third signal, and a preselected second transition period between the second time period and the first time period, the lag means comprising a lag capacitor, a voltage source with an output voltage and a return path, and a resistance network including a first resistance connected between a common lead of the lag capacitor and the output voltage, a second resistance connected between the common lead and an attachment point receptive of an output signal corresponding to the output of the comparator amplifier, and a third resistance connected between the attachment point and the return path, the output signal effecting a balance in the resistor network such that the lag capacitor is charged by the output voltage through the first resistance during the first transition period upon an increase in the output of the comparator amplifier, and the lag capacitor discharges through the second resistor during the second transition period upon a decrease in the output of the comparator amplifier, the charge on the lag capacitor corresponding to the output of the comparator means.

9. The system according to claim 1 or 2, wherein the means for producing the control signal further comprises pulse width modulating means receptive of the output signal of the comparator means for producing a narrow pulse width signal when the output of the comparator means corresponds to the absolute value of the difference being less than the deadband reference signal and a wide pulse width signal when the output of the comparator means corresponds to the absolute value of the difference being greater than the deadband reference signal.

10. The system according to claim 9 wherein the pulse width modulating means comprises a sawtooth wave generator and a pulse width modulating amplifier receptive of the sawtooth wave and the output of the comparator means.

11. The system according to claim 10 further comprising switch means for applying an idle voltage to the modulating amplifier such that the control signal effects the minimum time constant in the second control filter at start of powder flow, and means for opening the switch means at the start.

12. The system according to claim 1 or 2, wherein the means for producing the first signal comprises a load cell.

13. The system according to claim 1 or 2, further comprising a digital voltmeter for displaying the value of the scaled signal.

14. The system according to claim 13 wherein the second low-pass filter means further includes a second stage filter which is substantially the same as the first stage filter and is connected in series therewith.

15. The system according to claim 1 or 2, wherein the second low-pass filter means includes a first stage filter comprising:
two cascaded low-pass Sallen-Key filters each including a first-stage operational amplifier with a first input and a first output, a second-stage operational amplifier with a second input and a second output, and a feedback comprising a feedback resistor and a capacitor in series between the second output and the first input; and
a first analog switch and a second analog switch each connected in parallel with a first time-constant resistor and a second time-constant resister respectively, the first resistor and the first analog switch being connected to the first input and the second resistor and the second analog filter being connected between the first output and the second input, and the first and second analog switches being receptive to the control signal such as to selectively short circuit the respective first and second resistances in response to the control signal, thereby varying the time constant between the minimum value and the maximum value.

16. The system according to claim 2 wherein the combination signal means comprises a switching means receptive of the control signal to selectively pass the third signal to a point receptive of the fourth signal to produce the combination signal, and further comprises output filter means receptive of the combination signal.

17. The system according to claim 16 further comprising switch means for grounding the combination signal when the powder flow is turned off.

18. A method for measuring the rate at which powdered material flows from a container, comprising the steps of:
producing a first analog signal representing the weight of the container;
differentiating the analog signal to obtain a second signal corresponding to the flow rate;
adapting filtering the second signal by;
a. applying the second signal to a first low-pass filter having a first time constant for producing a third signal;
b. applying the third signal to a second low-pass filter to produce a fourth signal; and
c. varying the time constant of the second filter between a minimum equal to the time constant of the first filter and a maximum equal to a preselected multiple of the time constant of the first filter by comparing the absolute value of the difference between the third and fourth signals to a preselected deadband and effecting the maximum time constant when the absolute value of the difference is less than the deadband and the minimum time constant when the absolute value of the difference is greater than the deadband; and
scaling the fourth signal to indicate the powdered material flow rate.

19. A method for measuring the rate at which powdered material flows from a container, comprising the steps of:
producing a first analog signal representing the weight of the container;
differentiating the analog signal to obtain a second signal corresponding to the flow rate;
adapting filtering the second signal by;
a. applying the second signal to a first low-pass filter having a first time constant for producing a third signal;
b. applying the third signal to a second low-pass filter to produce a fourth signal; and
c. varying the time constant of the second filter between a minimum equal to the time constant of the first filter and a maximum equal to a preselected multiple of the time constant of the first filter by comparing the absolute value of the difference between the third and fourth signals to a preselected deadband and effecting the maximum time constant when the absolute value of the difference is less than the deadband and the minimum time constant when the absolute value of the difference is greater than the deadband; and
d. producing a combination signal comprising the fourth signal during the time when the absolute value of the difference is less than the deadband and the third signal during the time when the absolute value of the difference is greater than the deadband; and scaling the combination signal to indicate the powdered material flow rate.

20. The method according to claims 18 or 19 wherein the step of varying the time constant further comprises selecting one of a preselected group of deadband reference signals in dependence on the amplitude of the third signal and comparing one deadband reference signal to the absolute value of the difference between the third and fourth signals.

21. The method according to claims 18 or 19, wherein the step of varying the time constant further comprises producing a narrow pulse width signal when the comparison corresponds to the absolute value of the difference being less than the deadband reference signal and a wide pulse when the comparison corresponds to the absolute value of the difference being greater than the deadband reference signal.

* * * * *